(12) United States Patent
Takahashi

(10) Patent No.: US 10,886,527 B2
(45) Date of Patent: Jan. 5, 2021

(54) NEGATIVE ELECTRODE FOR NON-AQUEOUS SECONDARY BATTERY AND NON-AQUEOUS SECONDARY BATTERY USING THE NEGATIVE ELECTRODE

(71) Applicant: NEC ENERGY DEVICES, LTD., Sagamihara (JP)

(72) Inventor: Hiroo Takahashi, Kanagawa (JP)

(73) Assignee: Envision AESC Energy Devices Ltd., Sagamihara (JP)

( * ) Notice: Subject to any disclaimer, the term of this patent is extended or adjusted under 35 U.S.C. 154(b) by 113 days.

(21) Appl. No.: 15/558,369

(22) PCT Filed: Mar. 16, 2016

(86) PCT No.: PCT/JP2016/058310
§ 371 (c)(1),
(2) Date: Sep. 14, 2017

(87) PCT Pub. No.: WO2016/148185
PCT Pub. Date: Sep. 22, 2016

(65) Prior Publication Data
US 2018/0083270 A1 Mar. 22, 2018

(30) Foreign Application Priority Data

Mar. 19, 2015 (JP) .................................. 2015-056185

(51) Int. Cl.
*H01M 4/587* (2010.01)
*H01M 4/133* (2010.01)
(Continued)

(52) U.S. Cl.
CPC .............. *H01M 4/364* (2013.01); *C01B 32/21* (2017.08); *H01M 4/043* (2013.01); *H01M 4/133* (2013.01);
(Continued)

(58) Field of Classification Search
CPC ........ H01M 4/36; H01M 4/587; H01M 4/133; H01M 4/04; H01M 10/0525
See application file for complete search history.

(56) References Cited

U.S. PATENT DOCUMENTS

| | | | | |
|---|---|---|---|---|
| 2009/0098448 A1* | 4/2009 | Ozaki | ................ | C01G 45/1228 429/129 |
| 2010/0015524 A1* | 1/2010 | Kim | ...................... | H01M 4/133 429/207 |

(Continued)

FOREIGN PATENT DOCUMENTS

| | | |
|---|---|---|
| CN | 102150307 A | 8/2011 |
| JP | 2005-108611 A | 4/2005 |

(Continued)

OTHER PUBLICATIONS

Communication dated Sep. 6, 2018, from the European Patent Office in counterpart European Application No. 16765014.2.
(Continued)

*Primary Examiner* — Kenneth J Douyette
(74) *Attorney, Agent, or Firm* — Sughrue Mion, PLLC

(57) ABSTRACT

Provided with a negative electrode for a secondary battery comprising an anode active material that is a mixture of an amorphous carbon-coated graphite active material A having a density of 1.50 g/cm³ or less in press pelletizing at 2 kN/cm² and a carbon-based active material B having a density of 1.65 g/cm³ or higher in press pelletizing at 2 kN/cm² in a weight ratio of 90:10 to 99:1 as A:B, so that the cracking of amorphous carbon-coated graphite is suppressed and high-temperature life characteristics is improved.

15 Claims, 2 Drawing Sheets

(51) Int. Cl.
  *H01M 4/36* (2006.01)
  *H01M 10/052* (2010.01)
  *C01B 32/21* (2017.01)
  *H01M 4/04* (2006.01)
  *H01M 10/0525* (2010.01)
  *H01M 4/02* (2006.01)

(52) U.S. Cl.
  CPC ........... *H01M 4/366* (2013.01); *H01M 4/587* (2013.01); *H01M 10/052* (2013.01); *H01M 10/0525* (2013.01); *H01M 2004/027* (2013.01)

(56) References Cited

U.S. PATENT DOCUMENTS

| | | |
|---|---|---|
| 2012/0037845 A1 | 2/2012 | Yamamoto et al. |
| 2012/0064403 A1 | 3/2012 | Kameda et al. |
| 2013/0022861 A1* | 1/2013 | Miyagi ................ H01M 4/133 429/163 |
| 2013/0164618 A1* | 6/2013 | Konishi ................ H01M 4/133 429/217 |
| 2014/0170452 A1* | 6/2014 | Abe ...................... H01M 4/661 429/94 |
| 2015/0194668 A1 | 7/2015 | Ueda et al. |

FOREIGN PATENT DOCUMENTS

| | | |
|---|---|---|
| JP | 2010-251314 A | 11/2010 |
| JP | 2012-033375 A | 2/2012 |
| JP | 2015-038862 A | 2/2015 |

OTHER PUBLICATIONS

International Search Report for PCT/JP2016/058310 dated Jun. 21, 2016 [PCT/ISA/210].

Written Opinion for PCT/JP2016/058310 dated Jun. 21, 2016 [PCT/ISA/237].

* cited by examiner

[Fig. 1]
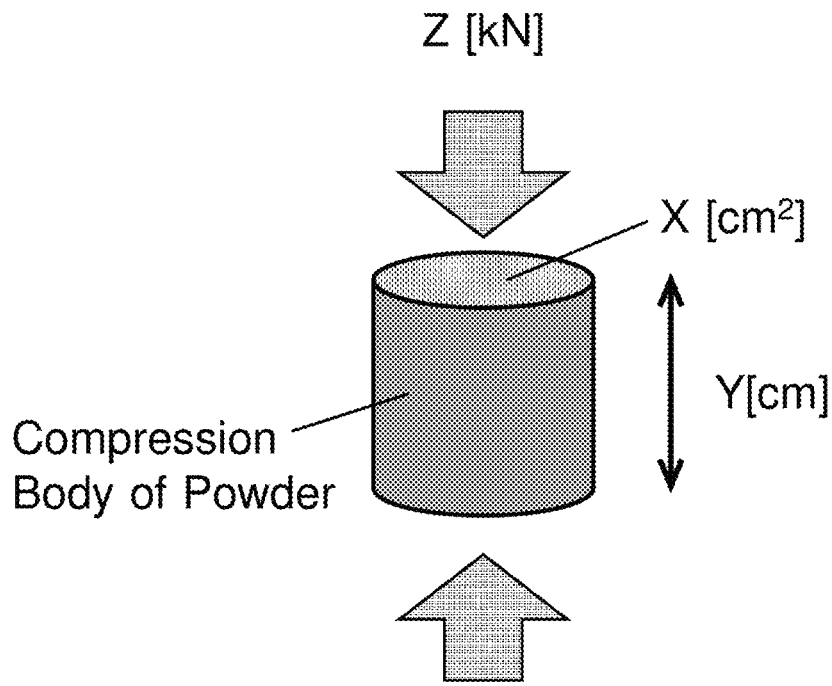
[Fig. 2]
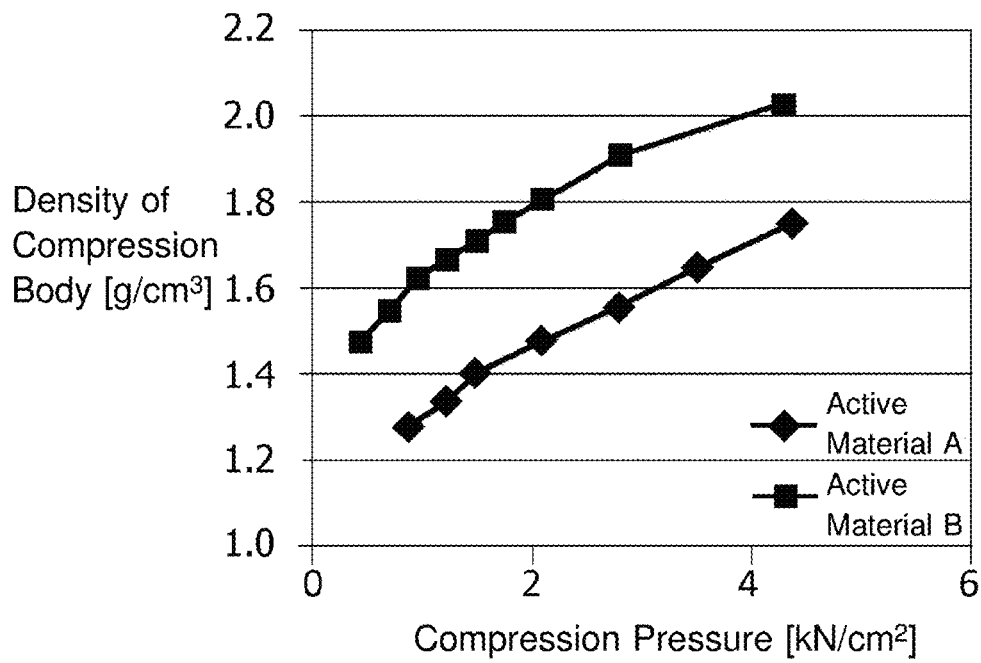

[Fig. 3]
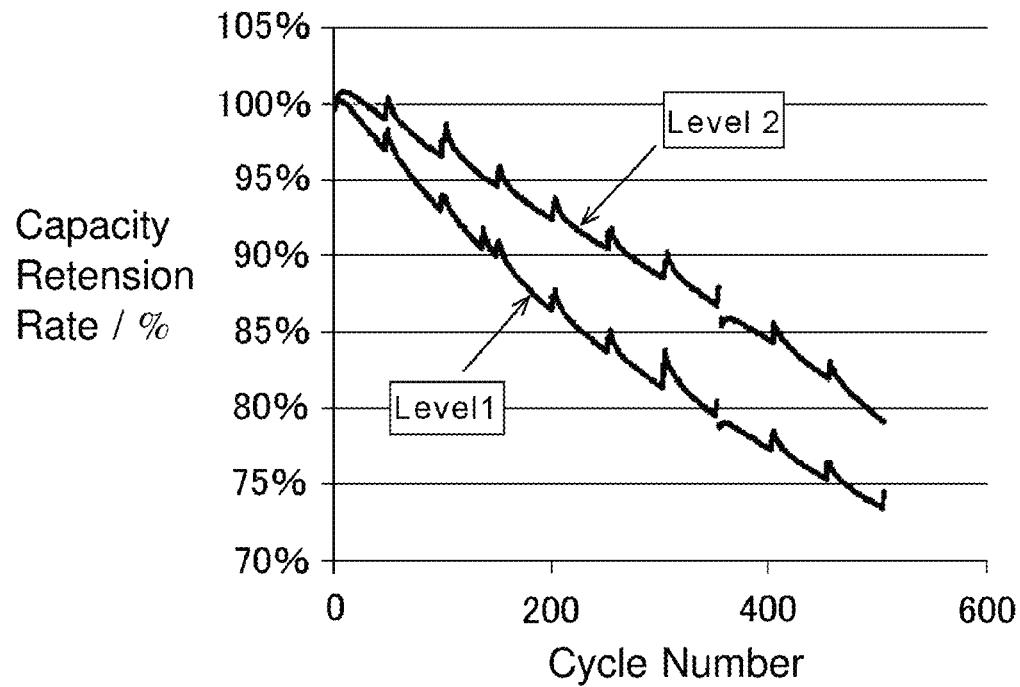
[Fig. 4]
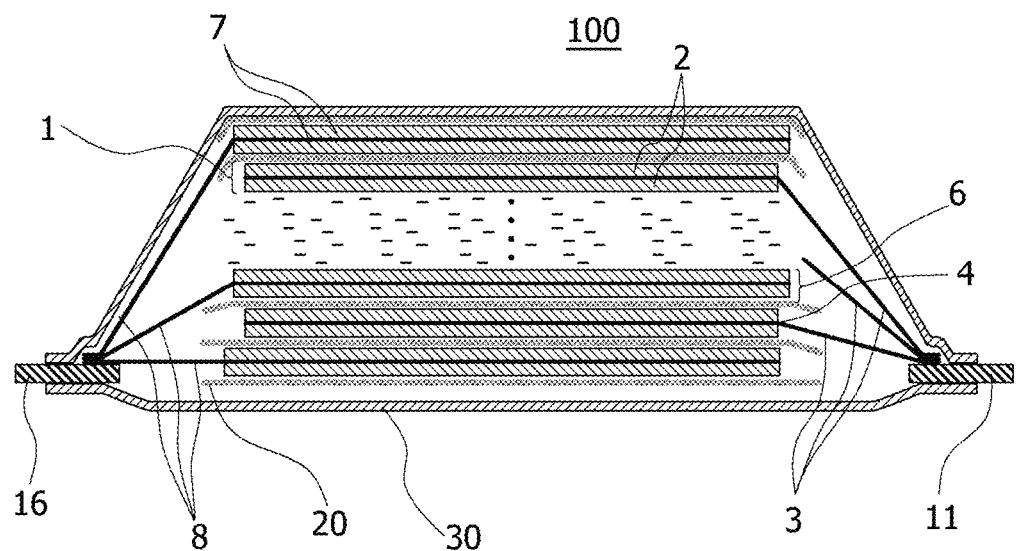

NEGATIVE ELECTRODE FOR NON-AQUEOUS SECONDARY BATTERY AND NON-AQUEOUS SECONDARY BATTERY USING THE NEGATIVE ELECTRODE

CROSS REFERENCE TO RELATED APPLICATIONS

This application is a National Stage of International Application No. PCT/JP2016/058310 filed Mar. 16, 2016, claiming priority based on Japanese Patent Application No. 2015-056185 filed Mar. 19, 2015, the contents of all of which are incorporated herein by reference in their entirety.

TECHNICAL FIELD

The present invention relates to a negative electrode for a non-aqueous secondary battery and a non-aqueous secondary battery using the negative electrode.

BACKGROUND ART

As a negative electrode material for lithium ion secondary batteries, it is often that a carbon material such as graphite or amorphous carbon is employed. When using the carbon material as the negative electrode material, since the carbon material has low theoretical capacity than metallic negative electrode active materials such as Si-based or Sn-based materials, it is necessary to densely pack the negative active material for high capacity battery. Graphite leads to increase charge-discharge irreversible capacity in the initial cycle due to material failure when densely packing an active material layer containing a negative electrode material for high capacity, as a result, there is a problem that it does not achieve to higher capacity.

Against such a problem, Patent Literature 1 proposes to use carbon materials composed of a composite carbon material (A) made from a spherical natural graphite and carbonized material precursor by the particular method, and natural graphite particles (B) as a negative electrode active material.

In addition, a method for preparing the negative electrode by densely filling a combination of a carbon material having a small average particle size and a carbon material having a large average particle size are also known. In Patent Literature 2, in a non-aqueous electrolyte secondary battery, a negative electrode active material composed of carbon-based materials is formed by mixing a first graphite particle having an average particle size of 5-25 µm and a second graphite particle having an average particle size of 20 µm to 45 µm, and the first graphite particle is provided with micropores of 0.1 µm to 10 µm in the particle. In this case, the first graphite particle is a graphite having a packing density of 1.60 g/cm$^3$ or higher, i.e., hardness of particles being soft, and the second graphite particle is a graphite having a packing density of 1.20 g/cm$^3$ or low, i.e., hardness of particles being hard. In the case of filling a mixture of these particles, the first graphite particle being soft particles and having a small particle size enters between the second graphite particles being hard particles and having larger particle size, so that it can be prevented that these particles are broken by compressive forces and it is possible to improve the liquid-absorbability.

CITATION LIST

Patent Literature

PTL 1: JP 2012-33375 A
PTL 2: JP 2005-108611 A

SUMMARY OF INVENTION

Technical Problem

Patent Literatures 1 and 2, although the characteristic values of an initial cycle and the characteristic values after several cycles have been shown, in an actual battery, characteristic values of several hundred cycles, for example, characteristic values of more than 500 cycles are important. Further, the use conditions of the battery, which is often exposed to temperatures greater than room temperature due to heat generation, that it is possible to improve the high-temperature life characteristics are important.

In a case of using a conventional amorphous carbon coating natural graphite as a negative electrode active material, it does not reach the crushing of the carbon material because it is covered with amorphous carbon, and the increase of the irreversible capacity is small. However, cracks are generated at the time of pressing the negative electrode, the interior of the natural graphite is exposed. Natural graphite is easy to react with the electrolyte, especially in higher temperatures than the room temperature, reduction in capacity becomes remarkable in accordance with repeated charge-discharge cycles.

It is an object of the present invention is to improve the high-temperature life characteristics by suppressing the cracking of an amorphous carbon-coated graphite in a negative electrode for a non-aqueous secondary battery in which the negative electrode is formed by high-pressure pressing of the amorphous carbon coated graphite.

Solution to Problem

According to one aspect of the present invention to solve the above problems, it is provided that:

A negative electrode for a non-aqueous secondary battery comprising an anode active material that is a mixture of an amorphous carbon-coated graphite active material A having a density of 1.50 g/cm$^3$ or less in press pelletizing at 2 kN/cm$^2$ and a carbon-based active material B having a density of 1.65 g/cm$^3$ or higher in press pelletizing at 2 kN/cm$^2$ in a weight ratio of 90:10 to 99:1 as A:B.

Advantageous Effects of Invention

The negative electrode for non-aqueous secondary battery according to an aspect of the present invention has a high capacity retention rate up to 500 cycles, in particular a high capacity retention rate at high temperatures can be achieved.

BRIEF DESCRIPTION OF DRAWINGS

FIG. 1 It is a conceptual view showing an aspect of the pellets of the anode active material.

FIG. 2 It is a graph showing the relationships of the active materials A and B between applied pressure during pelletizing and the compact density.

FIG. 3 It is a graph showing the capacity retention rate of up to 500 cycles in the case of the active material A alone and in the case of mixed use of the active materials A and B.

FIG. 4 It is a schematic sectional view showing a cross-sectional structure of a laminated lithium ion secondary battery 100 according to an example embodiment of the present invention.

DESCRIPTION OF EXAMPLE EMBODIMENTS

In the present invention, by combining a relatively hard amorphous carbon-coated graphite material A (referred to an active material A) and soft carbon material B (referred to an active material B) at a predetermined weight ratio, a cracking of the active material A can be suppressed at the time of pressing the negative electrode and as a result, high-temperature life characteristics can be improved by suppressing a reaction between the carbon material A and an electrolyte. Although it is shown in Patent Literature 2 combining a hard carbon material and a soft carbon material, the pressure as defined in Patent Literature 2 is $2N/cm^2$, which is one thousandth of $2 kN/cm^2$ in the present invention. In Patent Literature 2, although it has been described that the second graphite particle may be a natural graphite that is subjected to carbon coating, the evaluated second graphite particle (β) includes those not subjected to carbon coating.

Pressure as defined in Patent Literature 2 serves as an index of the degree of close packing of the carbon material, whereas pressure as defined in the present invention serves as an index of the packing density including plastic deformation of the carbon material.

In the present invention, the density in pelletizing is calculated from the cross-sectional area (Area X) of a compression body, the volume (area X×height Y: $cm^3$) of the compression body obtained by filling each powder of the active materials A and B into a cylindrical cylinder and compressing with a piston at a predetermined load Z (kN) as shown in FIG. 1, and the used amount (g) of the powder. FIG. 2 shows an example of the relationship between applied pressure and the density of the compression body. The active material A, An amorphous carbon coated natural graphite and artificial graphite are used as the active materials A and B, respectively. At the load of $2 kN/cm^2$, the density of the compression body using the active material A was $1.47 g/cm^3$ ($1.50 g/cm^3$ or less), and the density of the compression body using the active material B was $1.78 g/cm^3$ ($1.65 g/cm^3$ or more). Incidentally, the active material B is not applicable to the first graphite particle of Patent Literature 2, since it is already less than $1.60 g/cm^3$ at $1 kN/cm^2$.

As the active material A, graphite, as long as it satisfies the density of the compression body, may be any of natural graphite and artificial graphite, and it is preferable to use a natural graphite, which is a relatively high graphitization degree carbon material.

As the active materials B, as long as it satisfies the above density of the compression body, any carbon material may be used, but artificial graphite having a relatively high graphitization degree is typically mentioned. Graphitization degree of the active material B is represented by Id/Ig ratio in the Raman spectrum, and it is preferred that the ratio is 0.2 or less. The crystal structure of the active material B is examined by X-ray diffraction, it is preferable that the interlayer distance $d_{002}$ of the graphite structure is not more than 0.3365 nm. Owing to $d_{002}$ being not more than 0.3365 nm, even when the active material B is deformed during the anode pressing, it is possible to reduce the reactivity with a liquid electrolyte.

The active material A is further coated with amorphous carbon. By coated with amorphous carbon, it is possible to suppress the reaction with the electrolyte, and to increase the hardness of the material (to be hard). Active material B as long as satisfying the above density of the compression body may be coated with amorphous carbon. If the active material B is an artificial graphite, since the reactivity with the electrolytic solution is low as compared to the natural graphite and the active material B is used in less amount as compared to the active material A, there is no problem even if it is not covered with amorphous carbon.

The average particle sizes (D50) of the active materials A and B are preferably selected so that that of the active material A is greater than that of the active material B. Specifically, the average particle size (D50) of the active material A is preferably selected in a range of from 10 μm or more and 30 μm or less, and the average particle size (D50) of the active material B is preferably selected in a range from 5 μm or more and 15 μm or less.

When forming a negative electrode for a secondary battery using such a negative electrode active material, a binder is used in order to binding between particles on a current collector as a substrate. There are no particular limitations on the binder, conventionally known ones can be used. For example, polyvinylidene fluoride (PVdF), polytetrafluoroethylene (PTFE), carboxymethyl cellulose (CMC), styrene-butadiene copolymer (SBR), modified acrylonitrile rubber particles can be used. Further, conductive auxiliary agents and the like can be used for preparing the negative electrode as needed. As the conductive auxiliary agents, it is possible to use carbon black carbon fibers and graphite in singly or in a combination of two or more thereof. Incidentally, the graphite as the conductive auxiliary agent is a different from the graphite for the negative electrode active material, for example, graphite conductive agent has a large specific surface area, but less or no contribution to capacity. Carbon black is preferably used as the conductive auxiliary agent.

As the negative electrode current collector, copper, stainless steel, nickel, titanium or alloys thereof can be used, particularly copper is preferred.

A method of forming the negative electrode includes preparing slurry by mixing the active materials A and B according to the present invention in a predetermined ratio, then adding additives such as a binder and conductive auxiliary agent to for a mixture, and dispersing the mixture in a suitable solvent. The slurry is applied onto the negative electrode current collector, dried, and pressed with a predetermined pressure so that the electrode density becomes in the range of $1.40 g/cm^3$ or more and $1.70 g/cm^3$ or less. A method of coating the slurry includes, for example, a doctor blade method, a die coater method and the like. Alternatively, the negative electrode can be formed by preliminary press forming a negative electrode active material layer, and then forming a thin film of nickel, copper or an alloy thereof on the negative electrode active material layer by a method such as depositing sputtering. At this time, the active materials A and B are mixed so as to be a ratio of 90:10 to 99:1 on mass basis. The mixing ratio A:B is preferably from 92:8 to 98:2.

The negative electrode active material can be used in an amount of 80 mass % or more in the negative electrode active material layer, preferably 90 mass % or more, more preferably 93 mass % or more.

The binder can be used in an amount of 0.1 to 10 mass % in the negative electrode active material layer after drying, preferably in an amount of 0.5 to 5 mass %.

Other additives such as the conductive auxiliary agent are added as appropriate, the amount is not limited as long as desired properties can be obtained. The additives can be used in a total amount of 0.1 to 10 mass % in the negative electrode active material layer after drying, preferably in an amount of 0.1 to 5 mass %.

Negative electrode active material layer may be formed on one surface of the negative electrode current collector or on both surfaces.

To the negative electrode thus formed, a positive electrode are opposed through a separator to form an electrode stack, and the electrode stack is enclosed together with non-aqueous electrolyte (electrolytic solution) in a container composed of a battery outer package to obtain a non-aqueous electrolyte secondary battery.

The positive electrode can be formed similarly to the negative electrode by which a positive electrode active material layer containing the positive electrode active material is formed on a positive electrode current collector.

The positive electrode active material is not particularly limited, conventionally known ones can be used. For example, it is possible to use the known oxide particles such as LiNi-based composite oxide or LiMn-based composite oxide.

As the positive electrode current collector, aluminum, stainless steel, nickel, titanium or their alloys can be used, in particular, aluminum is preferred.

The positive electrode active material layer may be formed on one surface of the positive electrode current collector or on both surfaces similarly to the negative electrode active material layer.

Active material layer non-formation areas of the positive electrode current collector and negative electrode current collector can be drawn to the outside with connecting to the positive terminal and the negative terminal as the respective electrode tabs.

Examples of the separator include porous films, woven fabrics, nonwoven fabrics of resins. As the component of the resin, for example, polyolefin resins such as polypropylene or polyethylene; polyester resins, acrylic resins, styrene resins or nylon resins or the like can be used. Particularly a microporous film of polyolefin is preferable because it is excellent in physical isolation between the positive electrode and the negative electrode and the ion permeability.

Electrode stack may be respective single layer of the positive electrode and the negative electrode or combined multilayer from.

The electrolytic solution include an organic solvent such as cyclic carbonates, e.g., ethylene carbonate, propylene carbonate, vinylene carbonate and butylene carbonate; linear carbonates, e.g., ethylmethyl carbonate (EMC), diethyl carbonate (DEC), dimethyl carbonate (DMC), and dipropyl carbonate (DPC); aliphatic carboxylic acid esters; γ-lactones such as γ-butyrolactone; linear ethers; and cyclic ethers. The organic solvent can be used alone or a mixture of two or more to dissolve the lithium salt dissolved in the organic solvent. In the electrolytic solution, additives to form an SEI film (Solid Electrolyte Interface) on the surface of the anode, such as propane sultone, disulfonic acid ester, vinyl ethylene carbonate, and vinylene carbonate, or other flame retardant can be added.

The container accommodating the electrode stack can be used flexible films, can cases or the like, and it is preferable to use a flexible film from the viewpoint of weight reduction of the battery. The flexible film can be a laminate film provided a resin layer on the front and back surfaces of a metal layer as a base material. The metal layer can be selected to have a barrier property which prevents leaking of the electrolyte or penetration of moisture from external, it can be used aluminum, stainless steel or the like, but aluminum is particularly preferred. On at least one surface of the metal layer, heat-sealable resin layer, such as a modified polyolefin, is provided. The heat-sealable resin layers of the flexible films are opposed to each other, the surrounding of portions of the flexible film for accommodating the electrode stack are heat sealed to form the exterior package. A resin layer such as Nylon film and a polyester film on the outer surface opposite to the surface which is provided the heat-sealable resin layer can be provided.

The positive electrode terminal can be made of aluminum or aluminum alloy, and the negative electrode terminal can be made of copper or a copper alloy, nickel or nickel plating thereto. Each of the terminals are drawn out of the flexible film, the portion that is located around the outer casing that is a portion to heat seal can be provided in advance the heat-sealable resin to the respective terminals.

In FIG. 4, one cross-sectional structure of the laminate-type lithium ion secondary battery 100 that is an example embodiment of the present invention is shown schematically.

On the front and back surfaces of the positive electrode current collector in the positive electrode 1, a coated portion (positive electrode active material layer) 2 of which slurry comprising a positive electrode active material is coated and dried and an uncoated portion of the slurry is not coated are provided respectively. On the front and back surfaces of the negative electrode current collector 8 of the negative electrode 6, a coated portion (negative electrode active material layer) 7 of which slurry comprising a negative electrode active material is coated and dried and an uncoated portion of the slurry is not coated are provided respectively.

In the laminate battery 100 shown in FIG. 4, the uncoated portion of the positive electrode current collector that is not coated with the positive electrode active material is a positive electrode tab 3 for connecting a positive electrode terminal 11, uncoated portions of the negative electrode current collector that is not coated with the negative electrode active material is a negative electrode tab 8 for connecting a negative electrode terminal 16. The coated portion 2 of the positive electrode active material and the coated portion 7 of the negative electrode active material are stacked to face each other with a separator 20.

The positive electrode tabs 3 are grouped on the positive electrode terminal 11, and are connected to each other by ultrasonic welding or the like together with the positive electrode terminal 11. Similarly, the negative electrode tabs 8 are grouped on the negative electrode terminal 16, and are connected to each other by ultrasonic welding or the like along together with the negative electrode terminal 16. Then, one end of the positive electrode terminal 11 is drawn out of the flexible film 30, and one end of the negative electrode terminal 16 is also drawn out of the flexible film 30.

The boundary 4 of the uncoated portion and the coated portion 2 of the positive electrode active material may be formed an insulating member for preventing a short circuit between the negative electrode terminals.

Incidentally, the external dimension of the coated portion 7 of the negative electrode active material is preferably larger than the external dimension of the coated portion 2 of the positive electrode active material, and but smaller than the external dimension of the separator 20.

EXAMPLES

Hereinafter, the present invention will be described more specifically by way of Examples, but the present invention is not limited to these Examples.

Example 1

As an active material A, it was prepared amorphous carbon coating natural graphite (average particle size D50=15 μm). It was also prepared artificial graphite powder having an average particle diameter of D50=10 μm as an active material B. Each density during pelletizing was measured as shown in FIG. 1. The results are shown in FIG. 2. Id/Ig ratio in the Raman spectrum and $d_{002}$ of the active material B were 0.09 and 0.3360, respectively.

Next, slurry was prepared by mixing the active materials A and B with carboxymethyl cellulose (CMC) as a thickener and carbon black as a conductive auxiliary agent and binder (styrene butadiene copolymer) as shown in the following Table 1 and dispersing the mixture in purified water. The slurry was coated on a copper foil having a thickness of 10 which is a negative electrode current collector and dried, and then pressure-molded with a roll pressing machine so that the electrode density after pressing was 1.46 g/cm$^3$.

TABLE 1

| | Active Material A | Active Material B | Thickener | Binder | Conductive auxiliary agent |
|---|---|---|---|---|---|
| Level 1 | 96.7% | 0% | 1% | 2% | 0.3% |
| Level 2 | 91.9% | 4.8% | 1% | 2% | 0.3% |

(% is based on mass.)

On thus formed negative electrode, a positive electrode was stacked interposing a separator made of a porous polypropylene having a thickness of 25 μm to form an electrode stack. Negative electrode tabs and positive electrode tabs were ultrasonically welded with the negative electrode terminal and the positive electrode terminal, respectively. Thus formed electrode stack was accommodated with a non-aqueous electrolyte, in which ethylene carbonate (EC) and diethyl carbonate (DEC) is mixed in a volume ratio of 3:7, and 1M/L of LiPF$_6$ was added, in flexible films to prepare a secondary battery.

For the positive electrode, it was prepared a powder of which 60 parts by mass of a lithium transition metal composite oxide represented by $Li_{1.01}Ni_{0.5}Co_{0.2}Mn_{0.3}O_2$ and having the average particle size D50=10 and 40 parts by mass of lithium-manganese composite oxide represented by $Li_{1.02}Mn_2O_4$ were mixed. The powder was mixed with carbon black as a conductive aid material, and PVDF as a binder so as to being 93 parts by mass of the active material, 3 parts by mass of conductive auxiliary agent, and 4 parts by mass of the binder. The resultant mixture was added in N-methylpyrrolidone as a solvent to prepare slurry in which the particles were dispersed. The slurry was coated on an aluminum foil having a thickness of 20 μm which constituted a positive electrode current collector, then dried and molded with a roll press machine, so that the electrode density after pressing was 3.03 g/cm$^3$.

The secondary battery thus fabricated was subjected to charging and discharging repeatedly 500 cycles under the conditions of 45° C., MA and 4.15-2.5V, capacity retention rate (%) to the initial capacity (100%) was measured. The results are shown in FIG. 3.

In Level 2 to the present invention was achieved nearly 80% capacity retention rate at 500 cycles reached.

Hitherto, the present invention has been described by reference to the example embodiment (and the Examples), but the present invention is not limited to the example embodiment (and the Examples). Various changes understandable to those skilled in the art may be made on the constitution and details of the present invention within the scope of the present invention.

This application claims priority based on Japanese Patent Application No. 2015-056185 filed on Mar. 19, 2015, the entire disclosure of which is incorporated herein.

REFERENCE SIGNS LIST

1. Positive electrode
2. Coated portion of the positive electrode active material (Positive electrode active material layer)
3. Positive electrode tab
4. Boundary portion of the coated portion of the positive electrode active material and the uncoated portion
6. Negative electrode
7. Coated portion of the negative electrode active material (negative electrode active material layer)
8. Negative electrode tab
11. Positive terminal
12. Protective layer
16. Negative terminal
20. Separator
30. Flexible film
100. Laminate battery

The invention claimed is:

1. A negative electrode for a secondary battery, the negative electrode comprising,
    an anode active material that is a mixture of an amorphous carbon-coated graphite active material A having a density of 1.50 g/cm$^3$ or less in press pelletizing at 2 kN/cm$^2$ and a carbon-based active material B having a density of 1.65 g/cm$^3$ or higher in press pelletizing at 2 kN/cm$^2$ in a weight ratio of 92:8 to 98:2 as A:B, and
    a binder,
    wherein the negative electrode is formed by pressing so that a density of the negative electrode is 1.46 g/cm$^3$ or more and 1.70 g/cm$^3$ or less.
2. The negative electrode for the secondary battery according to claim 1, wherein an Id/Ig ratio of the active material B in Raman spectrum is 0.2 or less.
3. The negative electrode for the secondary battery according to claim 1, wherein the active material comprises graphite whose $d_{002}$ is 0.3365 nm or less.
4. The negative electrode for the secondary battery according to claim 1, wherein an average particle diameter D50 of the active material A is larger than that of the active material B.
5. The negative electrode for the secondary battery according to claim 4, wherein the average particle diameter D50 of the active material A is 10 μm or more and 30 μm or less and the average particle diameter D50 of the active material B is 5 μm or more and 15 μm or less.
6. A non-aqueous secondary battery comprising the negative electrode for the secondary battery according to claim 1.
7. The negative electrode for the secondary battery according to claim 2, wherein the active material comprises graphite whose $d_{002}$ is 0.3365 nm or less.

8. The negative electrode for the secondary battery according to claim 2, wherein an average particle diameter D50 of the active material A is larger than that of the active material B.

9. The negative electrode for the secondary battery according to claim 8, wherein the average particle diameter D50 of the active material A is 10 μm or more and 30 μm or less and the average particle diameter D50 of the active material B is 5 μm or more and 15 μm or less.

10. A non-aqueous secondary battery comprising the negative electrode for the secondary battery according to claim 2.

11. The negative electrode for the secondary battery according to claim 3, wherein an average particle diameter D50 of the active material A is larger than that of the active material B.

12. The negative electrode for the secondary battery according to claim 11, wherein the average particle diameter D50 of the active material A is 10 μm or more and 30 μm or less and the average particle diameter D50 of the active material B is 5 μm or more and 15 μm or less.

13. A non-aqueous secondary battery comprising the negative electrode for the secondary battery according to claim 3.

14. A non-aqueous secondary battery comprising the negative electrode for the secondary battery according to claim 4.

15. A non-aqueous secondary battery comprising the negative electrode for the secondary battery according to claim 5.

\* \* \* \* \*